(12) United States Patent
Berthiaume

(10) Patent No.: US 12,099,907 B2
(45) Date of Patent: *Sep. 24, 2024

(54) AUTOMATED GEOSPATIAL DATA ANALYSIS

(71) Applicant: Avalara, Inc., Seattle, WA (US)

(72) Inventor: David Berthiaume, Auburn, MA (US)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,799

(22) Filed: Apr. 4, 2023

(65) Prior Publication Data

US 2023/0244702 A1 Aug. 3, 2023

Related U.S. Application Data

(63) Continuation of application No. 17/740,157, filed on May 9, 2022, now Pat. No. 11,720,606, which is a
(Continued)

(51) Int. Cl.
G06N 20/00 (2019.01)
G06F 16/21 (2019.01)
(Continued)

(52) U.S. Cl.
CPC ........... G06N 20/00 (2019.01); G06F 16/212 (2019.01); G06F 16/2272 (2019.01);
(Continued)

(58) Field of Classification Search
CPC ... G06N 20/00; G06F 16/2272; G06F 16/212; G06F 16/244; G06F 16/288; G06F 16/29;
(Continued)

(56) References Cited

U.S. PATENT DOCUMENTS

| 6,308,177 B1 * | 10/2001 | Israni | G08G 1/0969 |
| | | | 701/461 |
| 7,353,114 B1 * | 4/2008 | Rohlf | G06F 40/143 |
| | | | 702/5 |

(Continued)

FOREIGN PATENT DOCUMENTS

WO 2005/089434 A2 9/2005

OTHER PUBLICATIONS

International Preliminary Report on Patentability received for PCT Patent Application No. PCT/US19/051966, mailed on Apr. 1, 2021, 7 pages.

(Continued)

*Primary Examiner* — Evan Aspinwall
(74) *Attorney, Agent, or Firm* — Jeremiah J. Baunach; Frontier IP Law PLLC

(57) ABSTRACT

Geospatial data is gathered for generation of a geodatacube encompassing data from multiple geospatial data sets for efficient processing and optimization. A method for gathering, storing and processing geospatial data includes identifying a plurality of geospatial data sets for intake, each defining a geospatial data parameter. For each geospatial data set, a plurality of subregions is defined such that each subregion corresponds to a portion of the geographic entity having the same value for the data parameter defined by the respective geospatial data set. In other words, subdividing the geographic entity along demarcations defined by variances in the data parameter(s) defined by the geospatial data set. A number of geospatial data sets for intake are arranged into layers, where each layer defines the data parameter for the respective subregions of the geographic entity. A partition defining polygons common to all layers represents a union of the subregions.

17 Claims, 9 Drawing Sheets

Related U.S. Application Data continuation of application No. 16/576,416, filed on Sep. 19, 2019, now Pat. No. 11,366,836.

(60) Provisional application No. 62/733,690, filed on Sep. 20, 2018.

(51) Int. Cl.
    *G06F 16/22* (2019.01)
    *G06F 16/242* (2019.01)
    *G06F 16/28* (2019.01)
    *G06F 16/29* (2019.01)
    *G06V 10/26* (2022.01)
    *G06V 10/44* (2022.01)
    *G06V 20/13* (2022.01)

(52) U.S. Cl.
    CPC .......... *G06F 16/244* (2019.01); *G06F 16/288* (2019.01); *G06F 16/29* (2019.01); *G06V 10/26* (2022.01); *G06V 10/44* (2022.01); *G06V 20/13* (2022.01)

(58) Field of Classification Search
    CPC ........ G06V 10/44; G06V 10/26; G06V 20/13; H04W 4/022
    USPC ......................................................... 707/740
    See application file for complete search history.

(56) References Cited

U.S. PATENT DOCUMENTS

| | | | |
|---|---|---|---|
| 7,580,927 B1 * | 8/2009 | Abugov | G06F 16/56 |
| 7,783,536 B2 | 8/2010 | William et al. | |
| 7,933,803 B1 | 4/2011 | Nadler et al. | |
| 8,363,068 B1 * | 1/2013 | Miller | G06F 3/0481 |
| | | | 345/660 |
| 8,620,578 B1 | 12/2013 | Brown et al. | |
| 8,725,407 B2 | 5/2014 | Hurley et al. | |
| 9,760,915 B2 | 9/2017 | Pavlou et al. | |
| 10,445,818 B1 | 10/2019 | Chowdhary | |
| 10,769,611 B2 | 9/2020 | McNeel | |
| 2002/0138765 A1 | 9/2002 | Fishman et al. | |
| 2005/0288836 A1 * | 12/2005 | Glass | G09B 29/106 |
| | | | 382/293 |
| 2007/0014488 A1 | 1/2007 | Chen et al. | |
| 2007/0136158 A1 | 6/2007 | Rawlings et al. | |
| 2007/0136159 A1 | 6/2007 | Rawlings et al. | |
| 2008/0278311 A1 * | 11/2008 | Grange | G06F 16/29 |
| | | | 340/539.2 |
| 2009/0005968 A1 * | 1/2009 | Vengroff | G06F 16/9537 |
| | | | 701/425 |
| 2009/0089254 A1 * | 4/2009 | Von Kaenel | G06F 16/00 |
| 2013/0013471 A1 | 1/2013 | Fishman | |
| 2014/0089052 A1 | 3/2014 | Jones et al. | |
| 2015/0169674 A1 | 6/2015 | Greenfield et al. | |
| 2016/0379388 A1 * | 12/2016 | Rasco | G06Q 10/04 |
| | | | 715/753 |
| 2017/0041407 A1 | 2/2017 | Wilbur et al. | |
| 2017/0052747 A1 * | 2/2017 | Cervelli | G06T 11/001 |
| 2017/0220603 A1 | 8/2017 | Riggs et al. | |
| 2017/0364733 A1 | 12/2017 | Estrada et al. | |
| 2018/0150764 A1 * | 5/2018 | Stenneth | G01C 21/3685 |

OTHER PUBLICATIONS

International Search Report and Written Opinion received for PCT Patent Application No. PCT/US19/051966, mailed on Dec. 12, 2019, 7 pages.

* cited by examiner

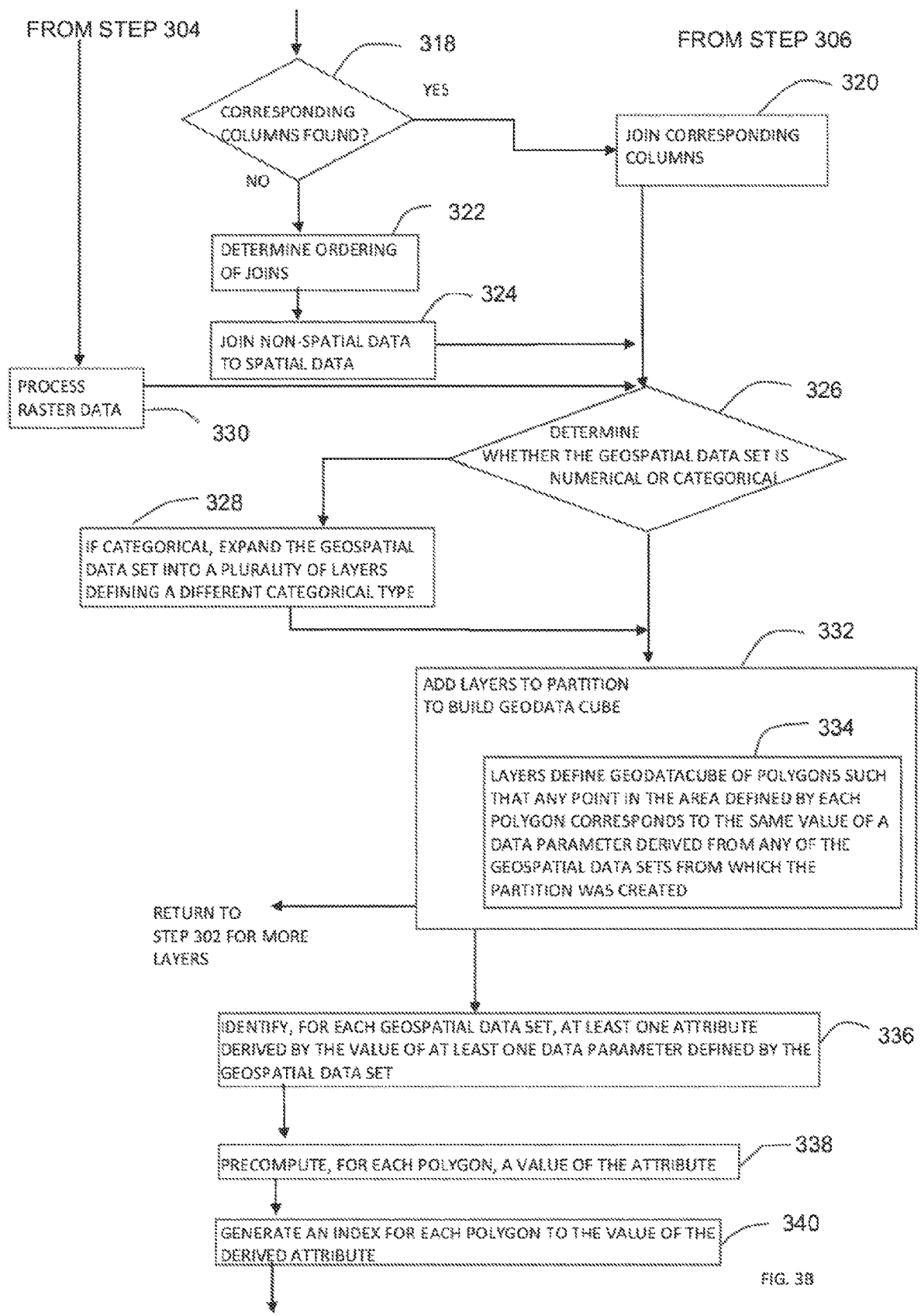

Target Variable: crash count

| rank | variable | strength | f test | mutual information | correlation | absolute correlation |
|---|---|---|---|---|---|---|
| 1 | traffic signal count | strong | 1.2202E-07 | 0 | 0.41160834 | 0.41160834 |
| 3 | street count | strong | 9.7579E-02 | 0.12161326 | 0.374492265 | 0.374492265 |
| 4 | census rent average | medium | 5.0415E-03 | 0.07571549 | 0.279793397 | 0.279793397 |
| 5 | census fraction male | medium | 4.7544E-08 | 0.11545917 | 0.271631484 | 0.271631484 |
| 6 | average number of units | medium | 4.6302E-08 | 0.06533333 | 0.268024174 | 0.268024174 |
| 7 | crime incidents count | medium | 1.9977E-08 | 0.02948061 | 0.253281434 | 0.253281434 |
| 8 | speed limit | medium | 3.6162E-08 | 0.09340548 | 0.238735291 | 0.238735291 |
| 9 | average travel times to work | medium | 3.3517E-08 | 0.05788434 | 0.227433137 | 0.227433137 |
| 10 | zoning district | medium | 9.2340E-06 | 0.00070949 | 0.227138827 | 0.227138827 |
| 11 | fraction has some college | medium | 3.0714E-08 | 0.04772979 | 0.221148913 | 0.221148913 |
| 12 | fraction has a mortgage | medium | 2.7511E-03 | 0.04235970 | 0.203639201 | 0.203639201 |
| 13 | median female age | medium | 2.7493E-08 | 0.05522092 | 0.209616401 | 0.209616401 |
| 14 | average home value | medium | 2.7262E-06 | 0.09456023 | 0.209913922 | 0.209913922 |
| 15 | median age | medium | 2.6403E-05 | 0.05827845 | 0.205598116 | 0.205598116 |
| 16 | sidewalk type | medium | 1.9803E-08 | 0.11359994 | -0.17002654 | 0.170024568 |
| 17 | NLCD imperviousness mean | medium | 1.5300E-08 | 0.02217019 | 0.162857598 | 0.162857598 |
| 18 | fraction male 5 to 9 | medium | 1.5357E-08 | 0.00178402 | 0.159353874 | 0.159353874 |
| 19 | census fraction own | medium | 1.4815E-03 | 0.01441839 | -0.15045863 | 0.150458638 |
| 20 | NLCD canopy cover mean | medium | 1.3934E-08 | 0.11894706 | -0.15085807 | 0.150858073 |
| 21 | average income | medium | 1.2611E-08 | 0 | 0.143686316 | 0.143686316 |
| 22 | one way street total length | weak | 1.0975E-08 | 0.07264642 | 0.130663813 | 0.130663813 |
| 23 | proximity to fire station | weak | 7.0469E-09 | 0 | 0.107834527 | 0.107834527 |
| 24 | NAIP channel 4 | weak | 6.5972E-09 | 0.07912727 | 0.104432487 | 0.104432487 |
| 25 | number of intersecting streets | weak | 6.2793E-09 | 0.03196432 | 0.101919866 | 0.101919866 |

AUTOMATED GEOSPATIAL DATA ANALYSIS

BACKGROUND

Geospatial data pertains to geographic features and attributes associated with a geographic region and is often associated with other non-spatial data for analysis. Modern data gathering and storage approaches allow vast amounts of data to be accumulated by various means. Performing an analysis of multiple heterogeneous spatial datasets often poses insurmountable difficulties both in terms of technical expertise needed and required amount of implementation cost and time. The use of geospatial datasets for approaching even simple questions can prove intimidating by researchers who are unfamiliar with such analysis techniques.

SUMMARY

Geospatial data is gathered for generation of a geodatacube data structure encompassing data from multiple heterogeneous geospatial data sets for efficient processing and optimization. The method for gathering, storing, and processing geospatial data includes identifying a plurality of geospatial data sets for intake, such that each geo spatial data set of the plurality of geospatial data sets defines one or more data parameters correlated to a geographic entity. The method determines, for each geospatial data set, a plurality of subregions, such that each subregion corresponds to a portion of the geographic entity having the same value for the data parameter defined by the respective geospatial data set. In other words, subdividing the geographic entity along demarcations according to variances in the data parameter(s) defined by the geospatial data set. A number of geospatial data sets for intake are arranged into layers, such that each layer defines the data parameter for the respective subregions of the geographic entity. The power of the geodatacube is apparent with uses for real-time data exploration and spatial operations, automated machine learning and automated deep learning, which leverage the combination and integration of a large number of geospatial data sets in a unitary object.

Each subregion also has a corresponding value on the other layers of the plurality of layers for a geographic location within the geographic entity, therefore, for a given point in the geographic entity, each layer defines a value for the layer's data parameter at that point. The method further subdivides the geographic entity into a plurality of polygons, such that each polygon defines an area of the geographic entity for which values at each layer are invariant, and stores, for each polygon, the value of the data parameter defined by each layer for the area within the polygon. Thus, each polygon refers to a corresponding geographic area in each layer, and on every layer, the value for each point in the polygon is invariant. Further subdivision of these regions is applied to optimize processing of the geospatial data including ensuring that polygons don't have too many vertices and ensuring that polygons are spatially compact to enable efficient spatial indexing. One can consider these polygons as a generalization of a raster. In a raster, each region of invariant data is defined by a pixel, a rectangular geographic region. In this case, these regions instead are defined by arbitrary polygons.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 3A-3C are a flowchart for building and using the geodatacube of FIG. 2;

FIG. 7 shows geodatacube usage for analytic processing; and

DETAILED DESCRIPTION

The description below presents an example of gathering geospatial data sets for generating the geodatacube for query response. The geodatacube is defined by a partition generated from multiple geospatial data sets ingested for generating a data structure adapted for usage in geospatial analysis and queries. As will be disclosed in the discussion that follows, the partition represents a novel manner of storing and processing geospatial data by arranging a number of sets as layers over the same geographic entity and defining a polygon as a portion of the area. These elements will be clarified and refined further in the discussion that follows.

Figure 1:
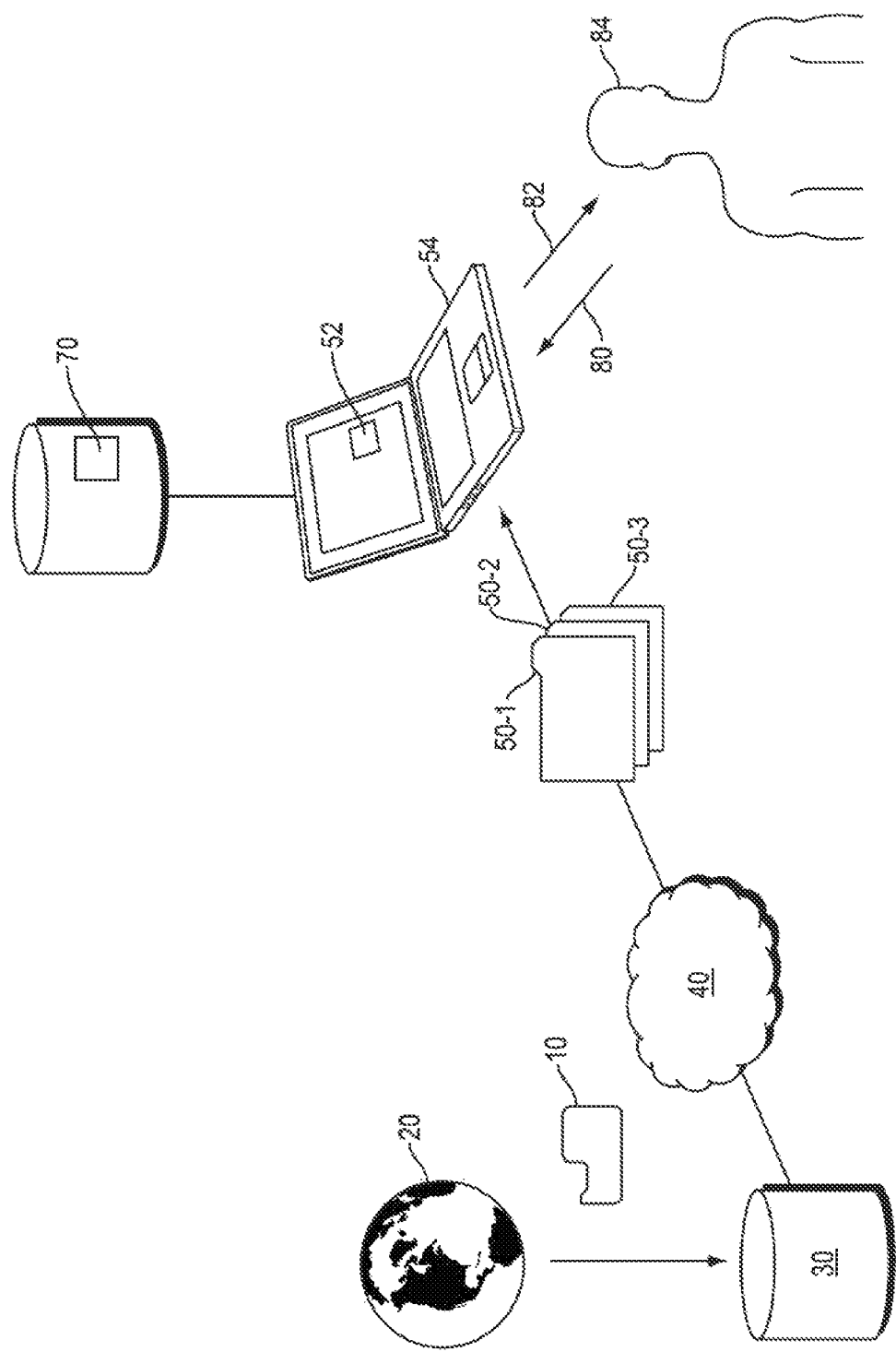
FIG. 1 is a context view of a geospatial analysis environment suitable for use with configurations herein.

FIG. 1 is a context view of a geospatial analysis environment suitable for use with configurations herein. Referring to FIG. 1, geospatial data generally represents data 10 associated with a geographic region 20. For many years, the United States Geological Survey (USGS), an agency charged with collection and interpretation of geospatial data, was the predominant user of geospatial data due to the volume of data generated and the computational resources required for use of the data. In recent decades, modern computing technology as allowed more widespread usage of geospatial data sets. Nonetheless, processing, interpretation and analysis of a number of geospatial data sets can rapidly compound to become an intractable task.

Gathered geospatial data 10 is stored in a repository 30. Various databases are available for both public and proprietary geospatial data sets 50-1 . . . 50-3 (50 generally), and are available via the Internet 40 for intake by an application 52 launched on a computing device 54. A number of geospatial data sets 50 may undergo an intake, or ingestion process for generation and storage of the geodatacube 70, defined herein as a partition of multiple geospatial data sets 50 and responsive to queries and interrogation by the application 52. Users 84 may issue requests and queries 80 and receive responses and analytic reports 82.

Figure 2:
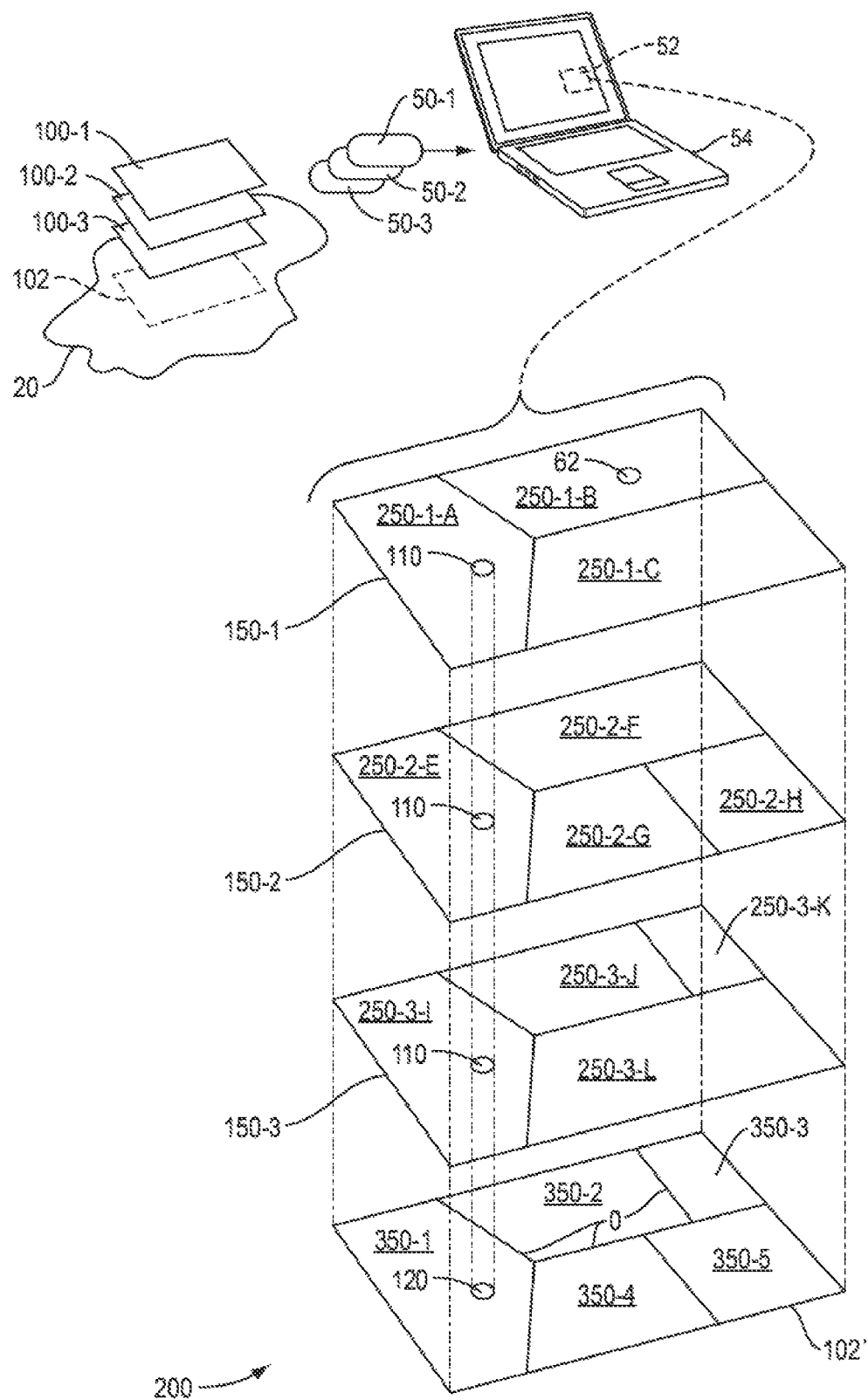
FIG. 2 shows a graphical depiction for building a geodatacube as disclosed herein.

FIG. 2 shows a graphical depiction for building a geodatacube as disclosed herein. Referring to FIGS. 1 and 2, geospatial information 100-1 . . . 100-3 (100 generally) exists in various forms for a given area of interest defining a geographic entity 102. Each of a plurality of geospatial data sets 50-1 . . . 50-3 includes different types of data gathered from the geographic entity 102. The application 52 combs through a drive, directory, or set of directories, analyzes all spatial data, both vector and raster in the directory, and generates summaries of the data including geometry types and spatial extents. The open source library GDAL (Geospatial Data Abstraction Library) may be employed to read and analyze 200+ different geospatial file formats and pipe the result through the PostgreSQL command line. This provides access to a multitude of GIS (Geographic Information Systems) files and data sources.

The application 52 performs an intake, during which it ingests the geospatial data sets 50 for determining, for each geospatial data set 50, a plurality of subregions 250-1-1 . . . 250-3-D (250 generally), such that each subregion 250 corresponds to a portion of the geographic entity 102 having the same value for the data parameter defined by the respective geospatial data set 50. In other words, in a geospatial data set defining foliage, one subregion denotes wooded areas, another might denote grass, and a third denotes street/asphalt.

The application further arranges the geospatial data 50-1 . . . 50-3 sets into layers 150-1 . . . 150-3 (150 generally), in which each layer 150 defines the data parameter for the respective subregions 250 of the geographic entity 102. Each subregion 250 also has a corresponding value 110 on the other layers of the plurality of layers 150 for a geographic location 120 within the geographic entity 102. The layers 150 are depicted graphically in a vertical orientation to illustrate how a given geographic location 120 corresponds to a geospatial feature, defined by the corresponding value 110, for each layer 150. Since each geospatial data set 50 defines a data parameter for each location in the geographic entity 102, respective data parameter values of a single location 120 may be visualized by a vertical column passing through all the layers 150.

Using all the layers 150 (3 are shown for exemplary purposes but many more may be employed), the application 52 subdivides the geographic entity into a plurality of polygons 350-1 . . . 350-5 (350 generally), such that each polygon 350 defines an area of the geographic entity 102 for which values of each layer 150 are invariant. Each polygon 350, therefore, defines a vertical partitioning, or "slice," common to all the subregions 250 on all the layers 150 defining all the geospatial data sets 50. The application 52 then stores, for each polygon 350, the value of the data parameter 62 defined by each layer 150 for the area within the respective polygon 350. Aggregation of the values occurs merely by summing or other simple operations on the values defined and indexed by each polygon 350.

Continuing to refer to FIG. 2, the polygons 350 are computed by determining a boundary 60 of each subregion 250 on each layer 150 of the plurality of layers, and designating the polygon 350 on a partition layer 102' (representative of the geographic entity 102) within the boundary 60 of one of the subregions 250 on each layer 150. Graphically, this is depicted by extending all the boundaries 60 through each layer 150 to demarcate individual regions of invariance for the values. In narrative detail, layer 150-1 includes subregions 250-1-A . . . 250-1-C. Layer 150-2 includes subregions 250-2-E . . . 250-2-H. Layer 150-3 includes subregions 250-3-I . . . 250-3-L. Following the boundaries vertically, it can be seen that subregion 250-1-A aligns with 250-2-E and 250-3-I, and when collapsed define polygon 350-1. Subregion 250-1-B collapses on 250-2-F, but is split by subregion 250-3-J and 250-3-K, thus defining polygons 350-2 and 350-3. Subregion 250-1-C spans both 250-2-G and 250-2-H, thus defining partitions 350-4 and 350-5 (subregion 250-3-L aligns with 250-1-C).

In can therefore be seen that area defined by each polygon 350 does not traverse a boundary of a subregion on any level 150 of the plurality of levels. Following the reversion of the polygons up through the layers, each of the polygons 350 passes through no more than a single subregion at each level 150. Further, the aligned boundaries 60 are shown for clarity, and boundaries 60 need not align with other layers-additional polygons 350 will simply be carved out. Each polygon therefore defines an area for which a value of a data parameter for the polygon is constant on each layer 150 of the plurality of layers, in effect defining a "column" of individual values on each layer 150. The arrangement of polygons 350 and associated values of the data parameters and related indices for each constituent level 150 define the partition identified herein as the geodatacube 70 (FIG. 1). It can further be seen that for any location 120 in the geospatial entity 102, a corresponding value 110 is defined for each layer 150 for that location 120.

Figure 3A:
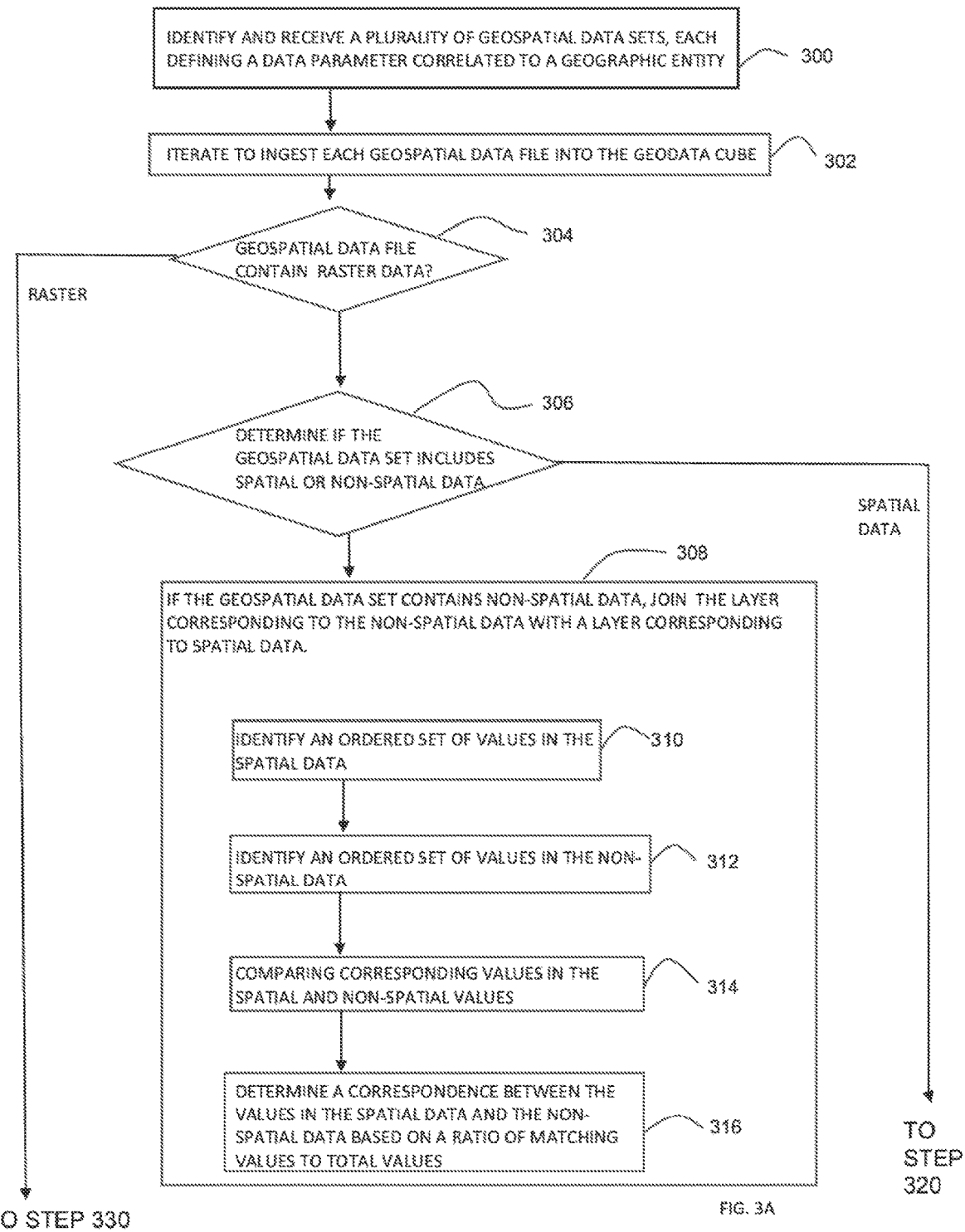
Figure 3C:
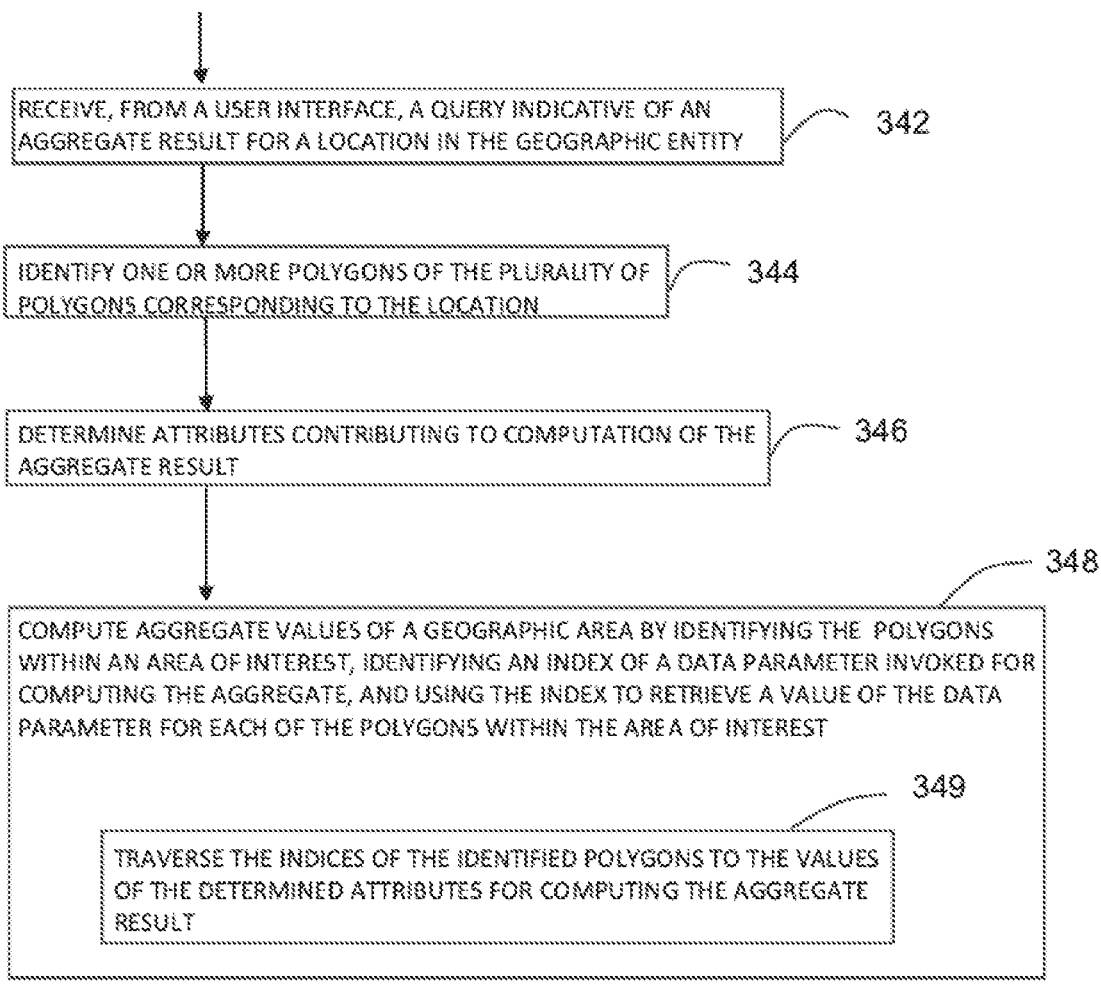

FIGS. 3A-3C are a flowchart for building and using the geodatacube of FIG. 2. Referring to FIGS. 2-3C, at step 300, the method for storing geospatial data includes identifying a plurality of geospatial data sets 100, such that each geospatial data set of the plurality of geospatial data sets defines a data parameter correlated to a geographic entity 102. Some geospatial data sets 100 may store values 62 for multiple parameters. During intake, the application 52 iterates for each of the identified geospatial data sets 150, as depicted at step 302. Once a directory or set of directories is analyzed for intake, any supported geospatial data that is found is imported into a PostGIS schema for further processing. Each geospatial file in the scanned directories will have a corresponding table in the schema, except for raster data, which is handled separately, discussed below.

An initial check at step 304 looks for raster data, handled at step 330. The application 52 then determines if the geospatial data set 50 includes spatial or non-spatial data, as depicted at step 306. Data often resides in non-spatial formats that are meant to be joined with spatial data using a table joins. A classic example of this is parcel and assessor data. The parcel data contains spatial polygons and a limited number of attributes such as area and a parcel id. Assessor data often resides as a separate file—often in CSV or Excel format—that also contains parcel ids. These parcel ids are joined with the parcel ids in the parcel polygon layer to attach the information in the assessor data to the polygons.

A check is made, at step 306, to determine if the geospatial data set includes non-spatial data. If the geospatial data 50 set contains non-spatial data, an attempt is made to join the data corresponding to the non-spatial data with a layer 50 corresponding to spatial data, as depicted at step 308 This includes joining spatial and non-spatial data by identifying an ordered set of values in the spatial data, as shown at step 310, and identifying an ordered set of values in the non-spatial data, as depicted at step 312. A comparison is performed to identify corresponding values in the spatial and non-spatial values, as depicted at step 314, and the application 52 determines a correspondence between the values 110 in the spatial data and the non-spatial data based on a ratio of matching values to total values, as disclosed at step 316.

The application 52 therefore joins non-spatial datasets to the spatial datasets when identical columns are detected, even when the column names do not match. This is done by looking at the unique set of values in each column and counting the number of matches that occur compared to the total number of elements for categorical attributes. Multiple joins are performed by creating a graph of the entire data set where vertices represent the data layers, and edges represent the detected matched columns, depicted in more detail below with respect to FIG. 4.

A check is performed, at step 318, to identify whether corresponding columns (or rows of ordered data) were found. If a corresponding column was found, the column is employed to join the spatial and non-spatial data, as depicted at step 320. If multiple joins are needed, then an ordering of the joins is performed for the non-spatial data, as shown at step 322, and the non-spatial data joined with the spatial data to define the layers 150 as depicted at step 324.

Raster data, handled separately from the spatial data, reenters from steps 304 and 330. The raster data, both categorical and numerical, is handled outside of PostgreSQL/PostGIS due to PostGIS having relatively poor performance when importing, clipping, and aggregating rasters. Raster data is integrated using high-performance libraries that provide just-in-time compiling and provide a significant increase in performance over native Python. This results in over a 30× increase in performance compared to PostGIS when managing and clipping rasters to a base geometry.

Another check is performed, at step 326, to determine whether the geospatial data set is numerical or categorical. Each attribute in the spatial data sets 50 that are ingested is classified into one of two types, numerical and categorical. Numerical attributes are variables that can be represented by a number, and include information such as proximity, sale price, and polygon area. Categorical attributes are those variables that are represented by strings or categorical numbers. Examples of categorical attributes are landcover type, street address, and zone type.

Often, the application 52 encounters data that has a categorical attribute representing a type. For example, a landcover layer has polygons with categorical attribute defining the land cover type. Instead of computing the proximity and adjacency to the nearest general landcover polygon, it may be beneficial to compute the proximity and adjacency to forests or bodies of water, both represented by a specific landcover type. For this reason, categorical variables that have a low number of distinct values, where appropriate, are 'exploded' in separate layers 150, one for each type. These are then treated similar to the other layers in the partition 200 and the full set of geometrical relationships and aggregates are computed for these new filtered layers 150. Accordingly, if categorical data is encountered, the application may expand the geospatial data set into a plurality of layers, such that each layer 150 defines a different categorical type, as depicted at step 328.

The accumulated layers 150 are defined for each spatial data set 50 to build the partition/geodatacube 70, as disclosed at step 332 (the partition 200 is a data structure that accumulates the layers; the completed partition 200 defines the geodatacube 70 used for queries and analysis). The resulting partition 200 includes polygons 350 across the entire area of interest 102 such that any point in the area defined by a polygon 350 corresponds to the same value of a data parameter derived from any of the geospatial data sets from which the partition was created, as depicted at step 334. Every point within the area of interest is part of one and only one element in this partition. Layer creation continues iteratively from step 302 until all data for the partition is complete.

Once the data is imported and optimized, the partition 200 data structure that contains all of the information from every geospatial file 50 that was imported, is created. The partition 200 includes the individual elements, or polygons 350, that contain uniform contiguous areas of invariant data. This may be visualized as a set of polygons 350 providing complete coverage 102' of the area of interest 102, along with values 62 for data parameters and attributes computed or derived from these values. Within each of these individual polygon 350 elements, all data is constant. For example, in a real-estate property example, one element (polygon) might contain a specific parcel, have a certain landcover value, not be part of a theft or crime, and be in a moderate flood zone. Another element might be part of a forest, not be part of any parcel, not be in a flood zone, and be part of a census block where 6% of the population has a Master's degree. Every point within this polygon element has exactly the same data values.

A technique called a union overlay is used to create these individual elements. A function in invoked that breaks up a region of interest into tiles, nodes the edges so that they have vertices at any intersections, and then creates polygons from the resulting noded edges. This is done in parallel across the tiles wherever possible. Finally, the attributes from the imported geospatial datasets are merged in with this partition by computing points on the interior of each element in the partition and then doing an intersection join with each of the imported geodatasets. Polygons are further subdivided during this stage to ensure computational efficiency.

Optimization of the partition is a beneficial step toward arranging the partition to receive and efficiently process queries. Processing hundreds or even dozens of geospatial data layers 150 has a high computation cost. With aggressive optimization, this process completes in a matter of minutes rather than hours or days. Polygons 350 are recursively subdivided so that the polygons are compact and spatial indexing remains effective. This greatly increases the calculation of intersection, proximities, and adjacencies which are performed in the next step. Spatial indices are created for each data layer and clustering is performed where appropriate. Indices are created for any non-spatial join that needs to be performed. A set of precomputed attributes that are likely to be implicated in subsequent queries is established.

The application 52 identifies, for each geospatial data set 100, at least one attribute derived by the value of at least one data parameter defined by the geospatial data set 100, as depicted at step 336 The application 52 precomputes, for each polygon 350, a value of the attribute, as shown at step 338, and generates an index for each polygon 350 to the value of the derived attribute, depicted at step 340. In the example configuration shown, and using a real estate/property parcel example, a set of spatial relationships are precomputed, including:

Adjacency, a binary variable indicating if two geometries are touching

Proximity

Attributes of nearest elements

Heading to closest feature

Variance in heading to closest features

Average proximity to closest n features where n is chosen based on the overall density of the variable being compared. This gives an estimate of local density.

The precomputed attributes are stored with the corresponding polygon 350 and indices for use in subsequent query responses. The establishment of precomputed attributes, along with the creation of the polygons having invariant values of parameters, can allow a liner parsing or traversal of the polygons to yield a result that would have imposed exponential computability in conventional approaches. Other optimization features include encompassing multiple polygons in an area by computing a rectangle to approximate the location called for by the received query, and identifying the polygons based on the computed rectangle.

Following establishment of the optimized partition, the application 52 is ready to receive, from a user interface, a query 80 indicative of an aggregate result for a location 110 in the geographic entity 102, as disclosed at step 342. This triggers identification of one or more polygons 350 of the plurality of polygons corresponding to the location 110, as depicted at step 344. The application 52 determines attributes contributing to computation of the aggregate result, as shown at step 346. The attributes include the values of the polygon 350 from the data parameters stored with the polygon, and precomputed attributes.

The application 52 computes aggregate values of a geographic area by identifying the polygons 350 within an area of interest 102, identifies an index of a data parameter invoked for computing the aggregate, and invokes the index to retrieve a value of the data parameter for each of the polygons 350 within the area of interest 102, as depicted at step 348. This includes traversing the indices of the identified polygons 350 to the values of the determined attributes for computing the aggregate result, as disclosed at step 349. Attributes are already computed before and in anticipation of usage in a query or analysis response, and aggregates are computed on demand from the attributes once called for by a query or analytic request.

Figure 4:
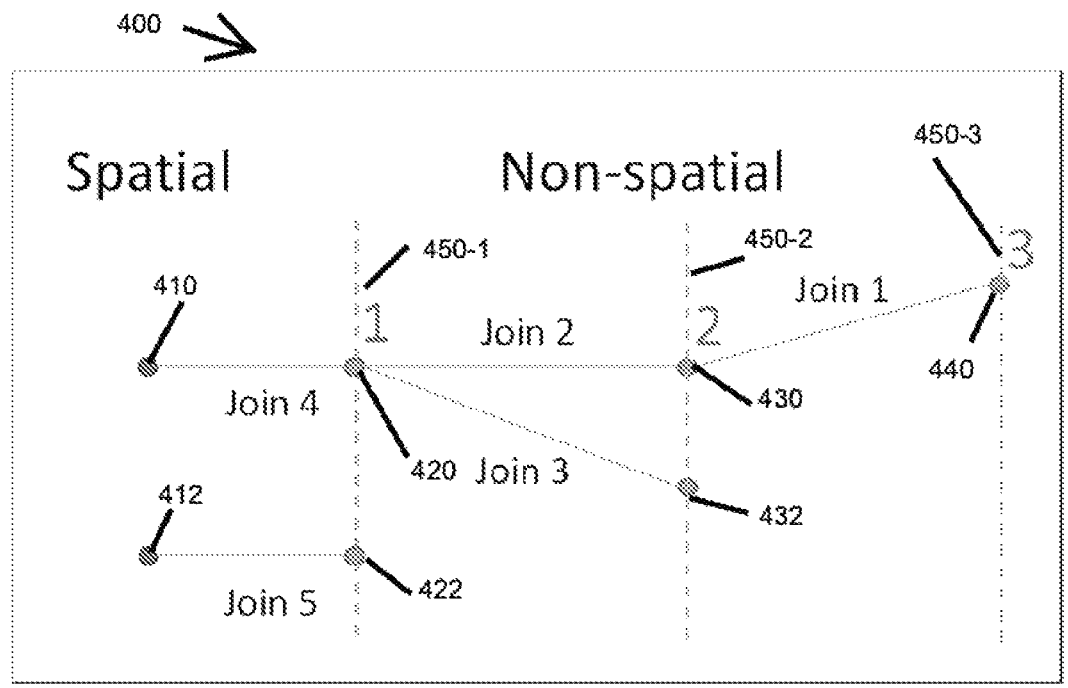
FIG. 4 shows the use of joins for establishing non-spatial data in the geodatacube of FIG. 2.

FIG. 4 shows the use of joins for establishing layers in the partition 200 of FIG. 2. As discussed above, joins are employed for associating or integrating non-spatial data (such as tabular lists and spreadsheets) with spatial data for populating a layer 150. Referring to FIGS. 2 and 4, in FIG. 4, distances in this graph to the nearest spatial layer are computed and then pairwise joins are completed with the furthest distant pairs of matching columns first. This allows for multiple joins to occur as in the case when we have parcel polygons, assessor data, and then auxiliary data that is meant to be joined with the assessor data. These layers 150 are merged together to be further processed by the geodatacube 70 generation approach.

FIG. 4 shows an example of the ordering 400 of the spatial joins. The vertices 410, 412 represent spatial layers, and the rightmost vertices 420-440 represent non-spatial layers (typically in tabular format such as CSV or Excel). Edges represent matched columns between layers, and the dotted lines 450-1 . . . 450-3 represent the edge distance from non-spatial data to spatial data. Join order is created using a depth-first search of this graph, resulting in join 1 occurring first and then in order to join 5. Most often, this graph is a forest or single tree. If a cycle is detected, a spanning tree is used.

Figure 5:
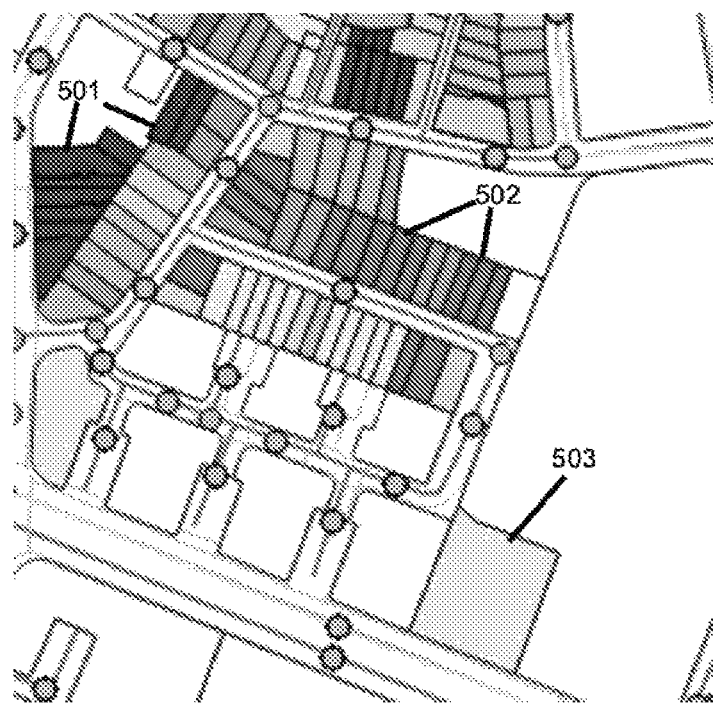
FIG. 5 shows an example depicting usage of the geodatacube of FIG. 2 for query and/or analytic responses.

FIG. 5 shows an example depicting usage of the geodatacube of FIG. 2 for query responses; Referring to FIGS. 2 and 5, FIG. 5 shows a graphical depiction of an area of interest 102 for parcel proximity to a sidewalk. This distance is one of the many derived spatial relationships that are computed on a partition 200. We can then directly find that proximity to a sidewalk is correlated with property value using a corresponding data set. FIG. 5 shows darker shaded regions 501 to depict the parcels having the closest sidewalk, a middle range is a lighter shading 502, and the lightest shading 501 denotes the greatest distance from a sidewalk.

In addition to these spatial relationships in the partition 200, features of the geometry of the elements are computed including area, perimeter, eccentricity, and number of edges. Here, the application 52 encodes both the spatial relationships and the geometry itself as numerical attributes which can be later used as input into machine learning models.

Figure 6:
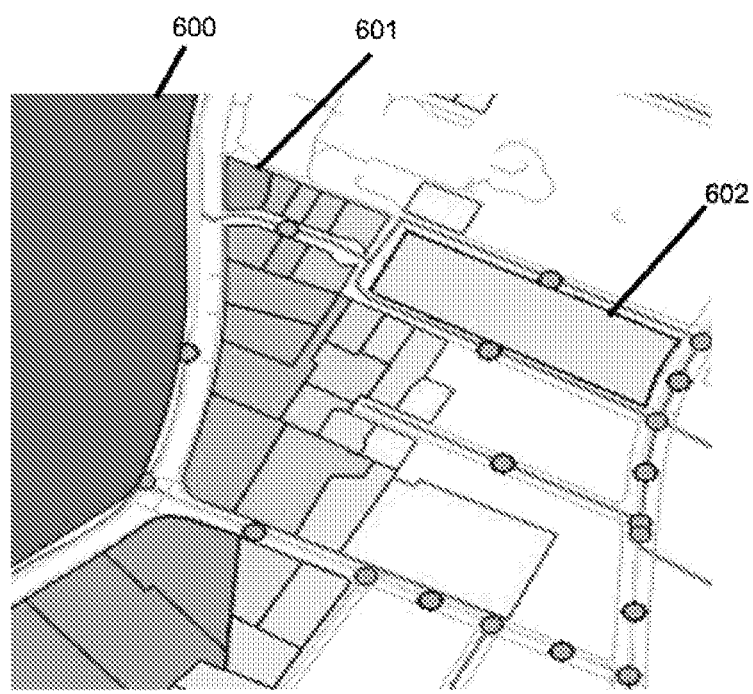
FIG. 6 shows an alternate query response.

FIG. 6 shows an alternate query response showing parcel proximity to water computed from an automatically exploded landcover layer. Darker shading 601 to light shading 602 and white represents increasing distance from the nearest water body 600.

The disclosed geodatacube 70, based on the generated partition 200, is a custom topology that encodes the geometry, attributes, and spatial relationships between the elements in a partition in an efficient format to allow for fast querying and automated machine learning. In contrast to conventional approaches, using the partition 200 approach, computationally expensive spatial operations (intersections, adjacency, proximity) become instant non-spatial aggregates. In other words, the aggregates may be computed by traversing the partition 200 in linear time to accumulate the precomputed attributes, rather than an exponential computability that varies with the number of layers or attributes. The partition 200 structure including the polygons 350 allows a computer or processing device executing the application to operate more efficiently and faster based on a traversal of the polygons and associated indices and data parameters. Traversal of the polygons 350 reduces computationally expensive spatial operations (intersections, adjacency, proximity) to immediate non-spatial aggregates.

One example to illustrate this concept includes computing a distance to nearest road. Suppose we wish to compute the distance to the nearest road to every building in an area of interest. This is a typical spatial operation that can be performed in conventional approaches that often takes a long time to run for reasonably large datasets.

To compute this distance using the partition 200 concept, the application 52 aggregates the minimum distance between each partition element (polygon 350) to the nearest building which has already been computed very efficiently during the creation of the partition 200. The distance to the nearest road is then simply the minimum of the distance to the nearest road of each partition element. We simply compute the minimum of this value across all elements in the partition that are within each building.

Another example is to compute fraction of parcel in a flood zone. In a typical GIS system, this would be accomplished by intersecting all parcels with flood zone polygons and computing the resulting area of the intersections with the area of the original parcel.

To compute this fraction using the partition 200, the application 52 simply sums the areas of all of the elements in the partition within the parcel (elements that have a particular parcel id) that are within a flood zone (have a positive flood id) and then divide this quantity by the parcel area. Again, this is a trivial aggregation (sum) of numbers and no spatial computations are required.

Another example computes the average tree canopy cover in a given census block. Tree canopy cover comes from a raster dataset. In a traditional GIS setting, one would intersect the census block polygons with the raster and then average all of the pixels from the raster in this intersection. With the partition 200, one performs an area weighted average of the precomputed average tree canopy cover in each element. This gives us the total average tree canopy cover over the whole census block.

These examples illustrate the efficiency achieved by precomputing geospatial attributes corresponding to each polygon 350 in the partition and aggregating the attributes of each polygon to compute a geospatial result based on the received request 80 (FIG. 1). This is further enhanced by defining an index indicative of, for each polygon, the value of the precomputed attributes for traversal.

FIG. 7 shows geodatacube usage for analytic processing. Referring to FIGS. 2 and 7, FIG. 7 shows an example table 700 of the variable significance calculated for the number of crashes that occur at each street intersection in Boston. We see here that traffic signal count 701, street count (the number of streets that approach that intersection) 702, average rent price 703, and the fraction of population that is male 704 are all top predictors according to simple linear correlation. Average rent price and fraction of population that is male comes from census data that is automatically aggregated to the base layer, which in this case are buffered street intersections. Summary statistics of raster data show up here as well. For example, the 17th most important variable is the mean NLCD imperviousness value 717 within each base polygon. This is a 30-meter resolution raster that represents the fraction of impervious surface, a proxy for urban density.

Colinear input features are detected and culled. For example, there may be two variables, area of parcel in square meters, and area of parcel in acres. These two variables contain the same information but are simply scaled differently. We do not wish to include both variables in the top variable list or as part of a machine learning model because these provide redundant information.

From the list of top variables, the user is then able to select the variables that they would like to use in the machine learning model that will be built to predict the quantity of interest. A strength column 710 calls out the ranges of significance of the variables.

Identification of the most significant variables provides input for extensions to machine learning. Once a variable importance feature list is generated and the user has selected the variables that they would like to use as inputs into the machine learning model, an automated machine learning model is created. Extensions also provide a precursor for deep learning, or neural networks. Neural networks are a type of deep neural network that are often used for analyzing imagery. The application 52 may employ convolutional neural networks to analyze aerial and satellite imagery and predict either categorical values (classification) or numerical values (regression). For example, such extensions may include building a learning model based on the partition and ingested geospatial data sets defining the partition and computing at least one aggregate result based on the learning model. Additional geospatial data sets 50 may be applied to the learning model, and the application 52 used to compute an indication of the additional geospatial data set of the computed aggregate result.

Figure 8A:
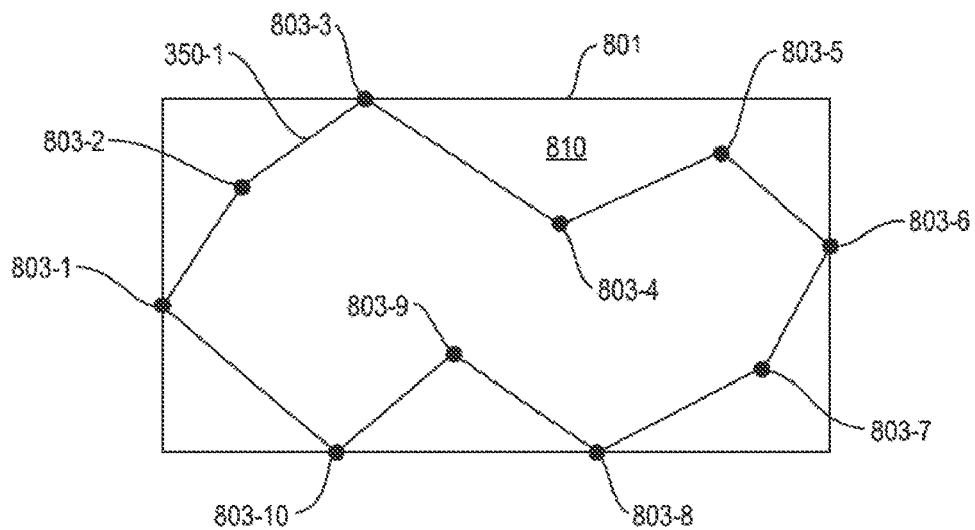
FIGS. 8A and 8B show a compacting approach to storing the polygons of FIG. 2.
Figure 8B:
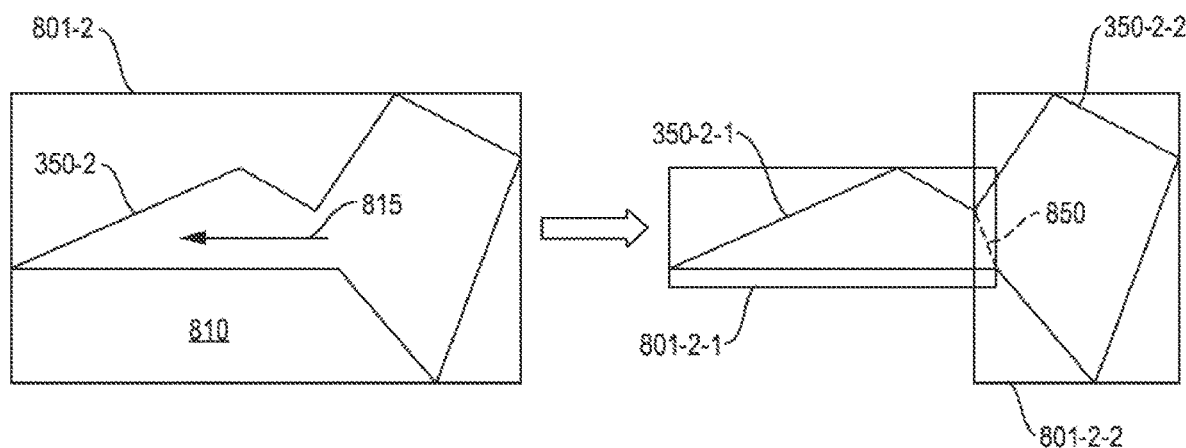

FIGS. 8A and 8B show a compacting approach to storing the polygons of FIG. 2. Referring to FIGS. 2, 8A and 8B, the polygon structure benefits when most of the polygons are similarly sized and of roughly corresponding dimensions. Efficiency begins to degrade when a computed polygon includes a large number of vertices or spans an irregular distance or area. In other words, it can be problematic to store a polygon that outlines a large "outside" area or has substantial "whitespace."

One measure of the efficiency of polygon storage is to identify the smallest enclosing rectangle. An enclosing rectangle, or bounding box 801 having substantial space outside the polygon is an indication that it may consume disproportionate storage space and impose computational inefficiencies.

Polygons 350 in the partition 200 are recursively subdivided to ensure computational efficiency within a spatial database that uses an R-tree indexing structure. There are several criteria. 1) These polygons should not have too many vertices to keep the storage sizes of the polygons small. This enables efficient querying. 2) A ratio of the area of the polygon 350 to the area of the smallest enclosing rectangle 801, defining a compactness ratio, is sufficiently large to ensure that bounding box indices are efficiently used.

FIG. 8A shows a bounding box 801 fitted around a polygon 350-1. The polygon 350-1 is defined by vertices 803-1 . . . 803-10 (803 generally). Area defined by the bounding box 801 but not within the polygon 350-1 denotes whitespace 810 used in computing a compactness ratio. To optimize polygon storage, the system identifies a polygon 350 as a candidate for subdividing into a plurality of compact polygons based on a number of vertices 803 and occupancy of a bounding box 801 that encloses the polygon in a rectangular outline. In such instances, the polygon is subdivided, based on an excessive number of vertices or a low occupancy of the bounding box, into at least two compact polygons.

Polygons that exceed this metric may be subdivided. FIG. 8B, shows a polygon 350-2 subdivided into compact polygons which have fewer vertices than the candidate polygon and have an occupancy of a respective bounding box greater than the occupancy of the candidate polygon. In FIG. 8B, a large whitespace 810 region is denoted by the extension 815 of the polygon 350-2. Accordingly, it is more efficient to subdivide along dotted line 850 into compact polygons 350-2-1 and 350-2-2, with bounding boxes 801-2-1 and 801-2-2, which define a better "fit" and compactness ratio inside respective bounding boxes 801-2. It should be apparent that the compact polygons each share the same invariant property as the polygon from which they were divided.

In particular examples it was found more efficient to derive a maximum number of vertices of 20 and a compactness ratio of 0.5 as thresholds for further subdivision. There is a trade-off between having individual polygons that are efficient versus having a larger number of polygons 350 overall in the partition 200.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A computer-implemented method for storing geospatial data comprising:
   determining, for each geospatial data set of a plurality of geospatial data sets, a plurality of subregions, in which each geospatial data set of the plurality of geospatial data sets defines a data parameter correlated to a geographic entity, and each subregion corresponding to a portion of the geographic entity having the same value for the data parameter defined by the respective geospatial data set;
   arranging the geospatial data sets into a plurality of layers, each layer of the plurality of layers defining the data parameter for the respective subregions of the geographic entity and having a corresponding value on the other layers of the plurality of layers for a geographic location within the geographic entity;
   subdividing the geographic entity into a plurality of polygons, each polygon of the plurality of polygons defining an area of the geographic entity for which values of each layer are invariant and defining an area for which a value of a data parameter for the polygon is constant on each layer plurality of layers; and
   storing, for each polygon, the value of the data parameter defined by each layer for the area within the polygon.

2. The method of claim 1 further comprising identifying a polygon by determining a boundary of each subregion on each layer of the plurality of layers and designating the polygon within the boundary of one of the subregions on each layer.

3. The method of claim 2 wherein the area defined by each polygon does not traverse a boundary of a subregion on any level of the plurality of levels.

4. The method of claim 1 wherein each polygon defines an area for which a value of a data parameter for the polygon is constant on each layer of the plurality of layers.

5. The method of claim 1 further comprising computing aggregates based on aggregate values of a geographic area by identifying the polygons within an area of interest, identifying an index of a data parameter invoked for computing the aggregate, and using the index to retrieve a value of the data parameter for each of the polygons within the area of interest.

6. The method of claim 1 wherein any point in the area defined by the polygon corresponds to the same value of a data parameter derived from any of the geospatial data sets from which the partition was created.

7. The method of claim 1 further comprising, for each of the identified geospatial data sets, determining if the geospatial data set includes spatial or non-spatial data, and if the geospatial data set contains non-spatial data, joining the layer corresponding to the non-spatial data with a layer corresponding to spatial data.

8. The method of claim 7 further comprising the joining spatial and non-spatial data by:
   identifying an ordered set of values in the spatial data;
   identifying an ordered set of values in the non-spatial data;
   comparing corresponding values in the spatial and non-spatial values; and
   determining a correspondence between the values in the spatial data and the non-spatial data based on a ratio of matching values to total values.

9. The method of claim 7 further comprising determining, if the ingested geospatial data set is spatial, whether the geospatial data set is numerical or categorical, and if categorical, expanding the geospatial data set into a plurality of layers, each layer of the plurality of layers defining a different categorical type.

10. The method of claim 1 further comprising:
    computing at least one attribute, the attribute having a value corresponding to each polygon and based on the value of one or more layers for the corresponding polygon, the attribute precomputed prior to receiving a query invoking the attribute; and
    defining an index, the index indicative of, for each polygon, the value of the precomputed attributes associated with the polygon.

11. The method of claim 10 further comprising efficiently performing computationally expensive spatial operations by computing aggregates of the precomputed attributes of a partition, using the indices to retrieve the precomputed attributes.

12. The method of claim 1 further comprising further subdividing the geographic entities to generate compact polygons.

13. The method of claim 1 further comprising:
    identifying, for each geospatial data set, at least one attribute derived by the value of at least one data parameter defined by the geospatial data set;
    precomputing, for each polygon, a value of the attribute; and
    generating an index for each polygon to the value of the derived attribute.

14. The method of claim 11 further comprising:
    receiving, from a user interface, a query indicative of an aggregate result for a location in the geographic entity;
    identifying one or more polygon of the plurality of polygons corresponding to the location;
    determining attributes contributing to computation of the aggregate result; and
    traversing the indices of the identified polygons to the values of the determined attributes for computing the aggregate result.

15. The method of claim 14 further comprising:
    computing a rectangle to approximate the location called for by the received query;
    identifying the polygons based on the computed rectangle.

16. The method of claim 1 further comprising:
    building a machine learning model based on the partition and ingested geospatial data sets defining the partition;
    computing at least one aggregate result based on the machine learning model;
    applying an additional geospatial data set to the machine learning model; and
    computing an indication of the additional geospatial data set of the computed aggregate result.

17. The method of claim 12 further comprising:
    identifying a polygon as a candidate for subdividing into a plurality of compact polygons based on a number of vertices and occupancy of a bounding box that encloses the polygon in a rectangular outline; and
    subdividing the polygon, based on an excessive number of vertices or a low occupancy of the bounding box, into at least two compact polygons, each compact polygon having fewer vertices than the candidate polygon and having an occupancy of a respective bounding box greater than the occupancy of the candidate polygon.

* * * * *